(12) United States Patent
Bromann et al.

(10) Patent No.: US 10,648,359 B2
(45) Date of Patent: May 12, 2020

(54) SYSTEM FOR CONTROLLING VARIABLE-SETTING BLADES FOR A TURBINE ENGINE

(71) Applicant: SAFRAN AIRCRAFT ENGINES, Paris (FR)

(72) Inventors: Alain Marc Lucien Bromann, Moissy-Cramayel (FR); Kamel Benderradji, Moissy-Cramayel (FR); Lilian Yann Dumas, Moissy-Cramayel (FR); Pamela Dominique Daniele Reichert, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 215 days.

(21) Appl. No.: 15/739,476

(22) PCT Filed: Jun. 14, 2016

(86) PCT No.: PCT/FR2016/051433
§ 371 (c)(1),
(2) Date: Dec. 22, 2017

(87) PCT Pub. No.: WO2016/207513
PCT Pub. Date: Dec. 29, 2016

(65) Prior Publication Data
US 2018/0223685 A1    Aug. 9, 2018

(30) Foreign Application Priority Data

Jun. 25, 2015  (FR) ...................................... 15 55846

(51) Int. Cl.
*F01D 17/16*    (2006.01)

(52) U.S. Cl.
CPC ...... *F01D 17/162* (2013.01); *F05D 2220/323* (2013.01); *F05D 2260/50* (2013.01)

(58) Field of Classification Search
CPC .......... F01D 17/00; F01D 17/10; F01D 17/12; F01D 17/14; F01D 17/16; F01D 17/162
See application file for complete search history.

(56) References Cited

U.S. PATENT DOCUMENTS

2016/0024959 A1*    1/2016    Do ........................ F01D 17/162
                                                           415/1

FOREIGN PATENT DOCUMENTS

| EP | 0909880 | 4/1999 |
|---|---|---|
| EP | 1489267 | 12/2004 |

(Continued)

OTHER PUBLICATIONS

International Search Report with English Language Translation, dated Aug. 8, 2016, Application No. PCT/FR2016/051433.

*Primary Examiner* — Richard A Edgar
(74) *Attorney, Agent, or Firm* — Womble Bond Dickinson (US) LLP

(57) ABSTRACT

The invention relates to a system for controlling variable-setting blades (14) for a turbine engine, which includes at least one control ring (36) mounted rotatably mobile about an annular casing (16) with axis of revolution A, at least one annular row of variable-setting blades (14) extending substantially radially relative to said axis A and connected to said at least one control ring so that a rotation of the ring about the casing rotates the blades about substantially radial axes B, and means (40) for actuating said at least one ring in order to rotate same about the casing, characterised in that said actuation means are connected to said at least one ring by linking means comprising a shaft (52) extending along an axis C which is substantially radial relative to said axis A and mounted rotatably mobile about said axis C on the housing.

11 Claims, 2 Drawing Sheets

(56) References Cited

FOREIGN PATENT DOCUMENTS

| | | |
|---|---|---|
| FR | 2983924 | 6/2013 |
| JP | S6119640 | 2/1986 |

\* cited by examiner

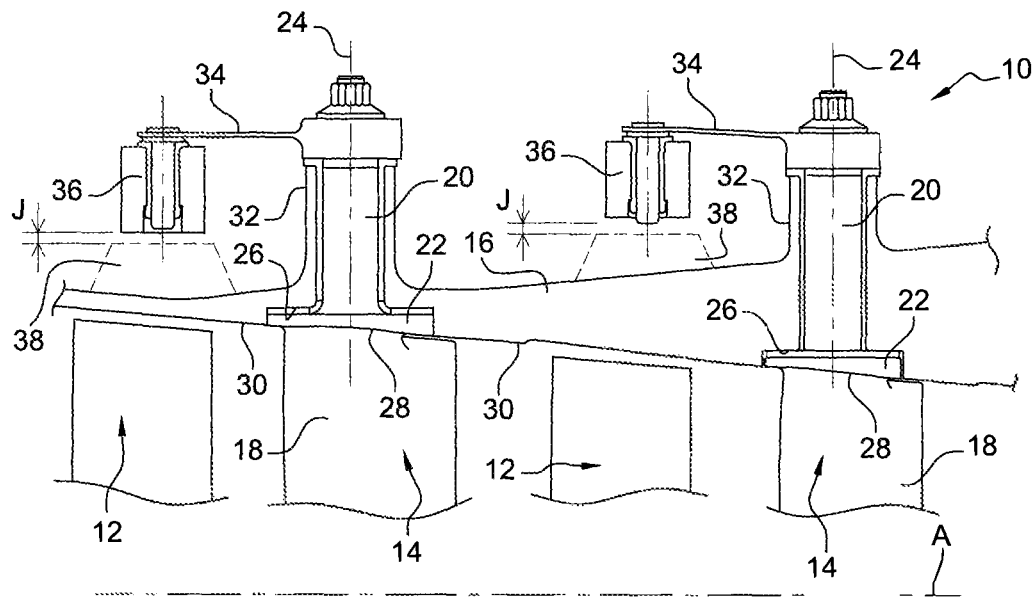
Fig. 1 - PRIOR ART
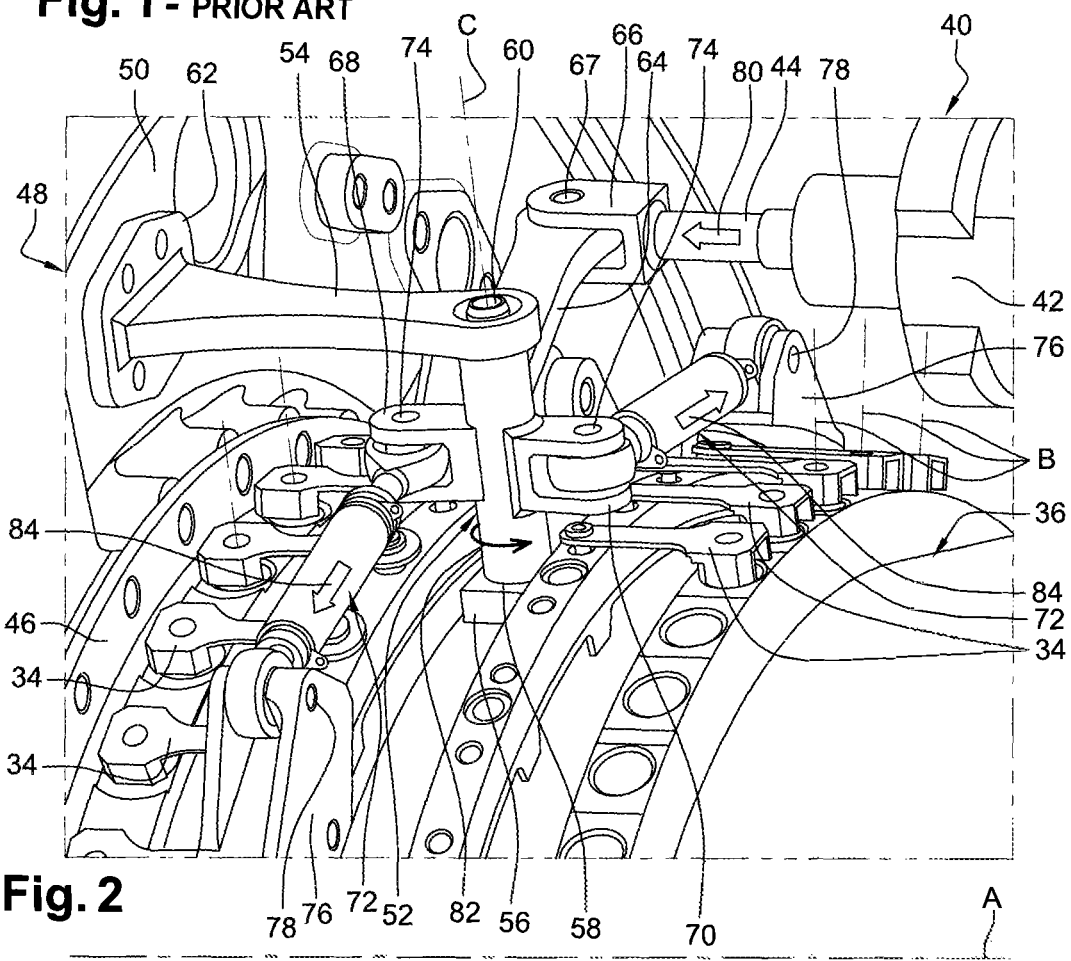
Fig. 2

SYSTEM FOR CONTROLLING VARIABLE-SETTING BLADES FOR A TURBINE ENGINE

TECHNICAL FIELD

The present invention relates to a system for controlling variable pitch vanes for a turbine engine.

PRIOR ART

The prior art particularly comprises documents FR-B1-2885968, FR-A1-2928979, JP-U-S6119640, EP-A1-1489267, FR-A1-2983924 and EP-A2-0909880 and WO-A1-2009/133297.

In the present application, the axis (longitudinal) of the turbine engine is defined as being the axis of rotation of the one or more rotor(s) of its engine, and in particular the rotors of its low- and high-pressure spools in the case of a twin-spool turbine engine. Terms such as internal, external, radial, axial, etc., refer to the position of a part relative to this axis.

The Variable Stator Vanes (VSV) of a turbine engine are supported by an external annular casing, generally a compressor of the turbine engine. Each vane comprises a blade that is connected at its radially external end to a radial cylindrical pivot that defines the axis of rotation of the vane and is rotationally guided in a corresponding orifice of the external casing. The radially internal end of the blade of each vane generally comprises a second cylindrical pivot extending along the axis of rotation of the vane and being rotationally guided in an orifice of an internal casing of the compressor.

The radially external end of the external pivot of each vane is connected by a lever to a control ring that is rotated about the external casing by actuator or similar actuation means. The rotation of the control ring is transferred by the levers to the external pivots of the vanes and causes them to rotate about their axes.

The angular pitch of the stator vanes in a turbine engine is intended to adapt the geometry of the compressor at its operating point and particularly to optimise the efficiency and the surge margin of this turbine engine and to reduce its fuel consumption in the various flight configurations.

Each of these vanes can rotate about its axis between a first "open" or "full open" position, in which each vane extends substantially parallel to the longitudinal axis of the turbine engine, and a second "shut" or "quasi-shut" position, in which the vanes are inclined relative to the axis of the turbine engine and thus reduce the section for the passage of air through the vane stage.

In the prior art, the actuation means are connected to one or more control ring(s) by relatively complex and bulky linking means. These linking means generally comprise many parts and relatively large assembly clearances, which leads to maximum hysteresis in all the flight envelopes.

The present invention proposes an improvement to this prior technology that allows at least part of the aforementioned problems to be overcome.

DISCLOSURE OF THE INVENTION

The invention proposes a system for controlling variable pitch vanes for a turbine engine, comprising at least one control ring mounted to freely rotate about an annular casing with an axis of revolution A, at least one annular row of variable pitch vanes extending substantially radially relative to said axis A and being connected to said at least one control ring so that a rotation of the ring about the casing sets the vanes into rotation about substantially radial axes B, and means for actuating said at least one ring so as to rotate it about the casing, said actuation means being connected to said at least one ring by linking means comprising a shaft extending along an axis C that is substantially radial relative to said axis A and is mounted to freely rotate about said axis C on the casing, characterised in that said shaft comprises a radially internal end mounted on the casing by a pivot link or ball joint link and a radially external end connected by a pivot link or ball joint link to a fixed arm rigidly connected to a casing or to the casing.

The radial orientation of the linking shaft allows the bulk (and therefore the mass) of the linking means and of the control system to be limited as a whole. This particularly can allow the actuation means to approach the one or more control rings. This also allows the clearances to be minimised and the number of parts for the system to be reduced, in order to achieve more accurate optimal adjustment in order to satisfy the requirements of the laws imposed by aerodynamics.

Linking the shaft to one or more casing(s) allows the forces to be better transferred towards this one or more casing(s). Linking the radially external end of the arm to the casing allows, for example, the forces applied to the radial shaft during operation to be picked-up.

The system according to the invention can comprise one or more of the following features, taken independently of each other or in combination with each other:
  said shaft comprises a first clevis for linking, via a first tensioner, to a first control ring;
  said shaft comprises a second clevis for linking, via a second tensioner, to a second control ring;
  said shaft is located between said first and second rings;
  said first and second clevises are diametrically opposed relative to said axis C;
  said first clevis or each of said first and second clevises supports an articulation shaft of the corresponding tensioner, which shaft is substantially radial relative to said axis A;
  said arm extends substantially parallel to said axis A;
  said arm comprises a first longitudinal end for linking to said shaft and a second opposite longitudinal end for fixing to said casing, which preferably is an intermediate casing fixed to said annular casing; and
  said second end comprises a plate for fixing to said casing.

The present invention further relates to a turbine engine, characterised in that it comprises at least one system as described above.

DESCRIPTION OF THE DRAWINGS

The invention will be better understood, and further details, features and advantages of the invention will become more clearly apparent, upon reading the following description, which is provided by way of a non-limiting example, and with reference to the accompanying drawings, in which:

FIG. 1 is a partial schematic half-view in an axial section of a system for controlling variable pitch blades of a turbine engine according to the prior art;

FIG. 2 is a partial schematic perspective view of a system for controlling variable pitch blades of a turbine engine according to the invention.

DETAILED DESCRIPTION

Figure 3:
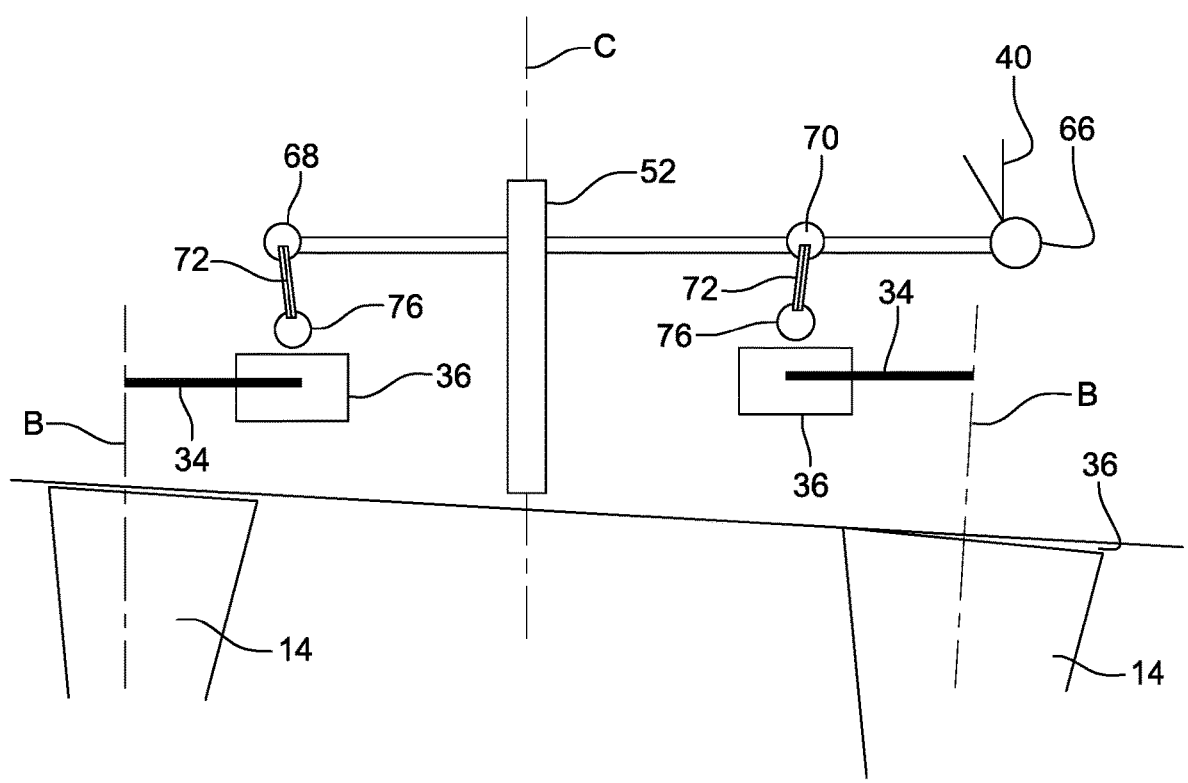
FIG. 3 is a highly schematic view of a control system according to the invention.

FIG. 1 schematically shows, in an axial section, part of a high-pressure compressor 10 of a turbine engine, particularly an aircraft turbine engine, with several stages, each stage comprising an annular row of movable vanes 12 supported by the rotor (not shown) of the turbine engine and an annular row of fixed vanes 14 forming rectifiers supported by a casing 16 of the stator of the turbine engine, the angular orientation of the vanes 14 being adjustable in order to optimise the gas flow in the compressor 10.

Each vane 14 comprises a blade 18 and a radially external cylindrical pivot 20 connected by a disc or "plate" 22 extending perpendicular to the axis 24 of the vane in a corresponding housing 26 of the casing 16. The radially internal surface 28 of the disc is aligned with the internal wall 30 of the casing so as not to oppose the gas flow.

In the prior art, the cylindrical pivot 20 of each vane 14 extends inside a radial cylindrical chamber 32 of the casing 16 and its radially external end is connected by a lever 34 to a control ring 36, which surrounds the casing 16 and is connected to actuation means (not shown) that allow it to rotate in one direction or in the other direction about the longitudinal axis of the casing 16 in order to set the vanes 14 of an annular row into rotation about their axes 24.

The vanes 14 can rotate about their axes 24 between a position, called full shut position, and a position, called full open position.

In the full shut position, the blades 18 of the vanes 14 are inclined relative to the longitudinal axis of the turbine engine, i.e. the chord of each vane (the line that connects the leading edge to the trailing edge) is substantially perpendicular to the longitudinal axis of the turbine engine. The blades 18 together define a minimum section for the passage of air in the duct. The vanes 14 are brought to this position when the turbine engine is at low speed or idling, the airflow flowing in the compressor then having a minimum value.

In the full open position, the blades 18 of the vanes 14 extend substantially parallel to the axis of the turbine engine, i.e. the chord of each vane is substantially parallel to the longitudinal axis of the turbine engine. The section for the passage of air between the blades 18 is then maximal. The vanes 14 are brought to this position when the turbine engine is at full throttle, the airflow flowing in the compressor then having a maximum value.

The casing 16 can comprise, on its outer periphery, projecting tracks 38, which are schematically shown in FIG. 1 by the broken lines, for centring and guiding the rings 36. Each ring 36 surrounds its one or more guide track(s) 38. Reference J denotes the radial clearances that are provided between a ring 36 and its one or more track(s) 38 when cold. These clearances J must be big enough to allow for the thermal expansion of the casing 16 but do not allow the angular positions of the vanes 14 to be precisely adjusted. These clearances J are adjusted using shims when assembling the control system.

The invention proposes an improvement to the means for linking actuation means to one or more control ring(s).

FIG. 2 shows an embodiment of the invention, which is highly schematically shown in FIG. 3.

According to the invention, these linking means comprise a radial shaft 52, which is mounted in a mobile manner on the casing about a radial axis C (FIG. 2).

In the embodiment shown in FIG. 2 and FIG. 3, the actuation means comprise an actuator 40, which is hydraulic, for example, comprising a body 42 fixed to the casing 16 and a piston rod 44. The actuator 40 is mounted on the casing 16 so that its piston rod 44 extends substantially parallel to an axis of revolution A of the casing 16.

In this case, the casing 16 has a substantially cylindrical shape and comprises, at a longitudinal end, an annular flange 46 for fixing to another annular casing 48 of the turbine engine, such as an intermediate casing well known to persons skilled in the art. This type of casing is mounted between a low-pressure compressor and a high-pressure compressor of the turbine engine. Only a substantially radial wall 50 of the intermediate casing 48 can be seen in FIG. 2. The actuator 40 is mounted on the casing 16 and downstream of the intermediate casing 48 (or on another casing, not shown), its piston rod 44 extending from the body 42 towards the intermediate casing 48.

The shaft 52 has linking means following a substantially radial orientation, i.e. it extends along an axis C that is substantially radial (or perpendicular) relative to the axis of revolution A of the casing 16 and of rotation of the control rings 36 mounted around the casing 16 or on the flange 46.

The shaft 52 has a generally substantially cylindrical shape and comprises a radially internal end mounted to freely rotate on the casing 16 and a radially external end that is also mounted to freely rotate on an end of an arm 54 rigidly connected to the intermediate casing 48, as shown in FIG. 2.

The casing 16 in this case comprises a boss 56 supporting pivot link or ball joint link means 58 at the radially internal end of the shaft 52. These linking means comprise, for example, at least one bearing, with the axis of rotation C, or at least one ball joint. The radially internal end of the shaft 52 supports, for example, a spherical portion or a shaft engaged in a recess of a spherical portion, which is housed in a spherical cavity of the boss 56.

Similarly, the arm 54 supports pivot link or ball joint link means 60 at the radially external end of the shaft 52. These linking means comprise, for example, at least one bearing, with the axis of rotation C, or at least one ball joint. The radially internal end of the shaft 52 supports, for example, a spherical portion or a shaft engaged in a recess of a spherical portion, which is housed in a spherical cavity of the boss 56.

The arm 54 has an elongate shape and extends substantially parallel to the axis A. It comprises, at its upstream end, a plate 62 for fixing to the intermediate casing 48 and, at its downstream end, said linking means 60.

The shaft 52 comprises a lever 64 for linking to the piston rod 44 of the actuator 40. The lever 64 has an elongate shape and extends in a direction substantially perpendicular to the axis C. One of its ends is connected to the shaft 52, in the vicinity of the radially external end thereof, and its opposite end is articulated with the piston rod 44. This opposite end of the lever 64 is engaged between the lugs of a clevis 66 provided at the free end of the piston rod 44, and is articulated by a ball joint link or a pivot link on a shaft 67 supported by the clevis 66. The lever 64 can be formed as a single piece with the shaft 52. The shaft 67 has a substantially radial orientation.

The shaft 52 further comprises two clevises 68, 70, which in this case are diametrically opposed and are located substantially halfway up (measured in the radial direction) the shaft 52. The clevises 68, 70 respectively extend upstream and downstream from the shaft 52. The clevises 68, 70 are formed as a single piece with the shaft 52.

Each clevis 68, 70 comprises two lugs, between which an end of a tensioner 72 is mounted, and supports an articulation shaft 74 of this end. The shafts 74 each have a substantially radial orientation.

Each tensioner 72 allows a control ring 36 to be controlled. The end of the tensioner 72, opposite the shaft 52, is thus articulated on a clevis 76 supported by the corresponding ring 36. Each clevis 76 supports an articulation shaft 78 of this end, which has a substantially axial orientation. The tensioners 72 are well known to persons skilled in the art and thus will not be described.

As can be seen in FIG. 2, the shaft 52 is located between the two control rings 36 connected to this shaft 52. Each ring 36 passes into the radial space extending between the casing and the clevis 68, 70 connected to this ring. Each tensioner 72 has a substantially tangential orientation relative to a circumference centred on the axis A and substantially extends in the plane of the corresponding ring 36, which is perpendicular to the axis A.

During operation, the actuator 40 actuates its piston rod 44, which sets the shaft 52 into rotation about its axis C, by means of the lever 64. In the event that a movement of the rod 44 occurs towards the intermediate casing 48, i.e. upstream (arrow 80), the lever and the shaft rotate in the anti-clockwise direction (arrow 82). The rotation of the shaft 52 will cause a circumferential separation of the tensioners and rotations of the rings 36 in opposite directions (arrows 84). The rotation of each ring 36 causes each vane to rotate about its axis B. The forces of the system are picked-up by the arm 54.

The invention claimed is:

1. System for controlling variable pitch vanes for a turbine engine, comprising at least one control ring mounted to freely rotate about a first annular casing with an axis of revolution A, at least one annular row of variable pitch vanes extending substantially radially relative to said axis A and being connected to said at least one control ring so that a rotation of the ring about the first casing sets the vanes into rotation about substantially radial axes B, and means for actuating said at least one ring so as to rotate it about the first casing, said actuation means being connected to said at least one ring by linking means comprising a shaft extending along an axis C that is substantially radial relative to said axis A and is mounted to freely rotate about said axis C on the first casing, characterised in that said shaft comprises a radially internal end mounted on the first casing by a pivot link or ball joint link and a radially external end connected by a pivot link or ball joint link to a fixed arm rigidly connected to a second casing or to the first casing.

2. System according to claim 1, wherein said shaft comprises a first clevis for linking, via a first tensioner, to a first control ring.

3. System according to claim 2, wherein said shaft comprises a second clevis for linking, via a second tensioner, to a second control ring.

4. System according to claim 3, wherein said shaft is located between said first and second control rings.

5. System according to claim 3, wherein said first and second clevises are diametrically opposed relative to said axis C.

6. System according to claim 3, wherein said first clevis or each of said first and second clevises supports an articulation shaft of the corresponding tensioner, which articulation shaft is substantially radial relative to said axis A.

7. System according to claim 1, wherein said arm extends substantially parallel to said axis A.

8. System according to claim 1, wherein said arm comprises a first longitudinal end for linking to said shaft and a second opposite longitudinal end for fixing to said second casing.

9. System according to claim 8, wherein said second end comprises a plate for fixing to said second casing.

10. System according to claim 8, wherein said second casing is an intermediate casing fixed to said first annular casing.

11. Turbine engine for aircraft, comprising at least one system according to claim 1.

* * * * *